(12) United States Patent
Lee et al.

(10) Patent No.: US 9,154,662 B2
(45) Date of Patent: Oct. 6, 2015

(54) METHOD AND APPARATUS FOR MANAGING MEMORY IN AN ELECTRONIC DEVICE

(75) Inventors: John Jong-Suk Lee, Waterloo (CA); Alen Mujkic, Mississauga (CA); Jeffrey Bos, Waterloo (CA)

(73) Assignee: BLACKBERRY LIMITED, Waterloo (CA)

( * ) Notice: Subject to any disclaimer, the term of this patent is extended or adjusted under 35 U.S.C. 154(b) by 1871 days.

(21) Appl. No.: 12/276,525

(22) Filed: Nov. 24, 2008

(65) Prior Publication Data

US 2010/0131521 A1    May 27, 2010

(51) Int. Cl.
G06F 17/30 (2006.01)
H04N 1/21 (2006.01)
H04N 1/00 (2006.01)
H04N 101/00 (2006.01)

(52) U.S. Cl.
CPC ............ *H04N 1/21* (2013.01); *H04N 1/00307* (2013.01); *H04N 2101/00* (2013.01); *H04N 2201/212* (2013.01); *H04N 2201/214* (2013.01)

(58) Field of Classification Search
CPC ............................. H04N 1/21; H04N 2201/24
See application file for complete search history.

(56) References Cited

U.S. PATENT DOCUMENTS

| | | | |
|---|---|---|---|
| 6,122,411 A | 9/2000 | Shen et al. | |
| 6,263,106 B1 | 7/2001 | Yamagata | |
| 6,885,395 B1 | 4/2005 | Rabbani et al. | |
| 7,142,235 B2 | 11/2006 | Herley | |
| 7,330,207 B2 | 2/2008 | Ohmori | |
| 2004/0075750 A1 | 4/2004 | Bateman | |
| 2004/0090539 A1 | 5/2004 | Kim | |
| 2006/0193470 A1* | 8/2006 | Williams | 380/259 |
| 2006/0274165 A1 | 12/2006 | Levien | |

FOREIGN PATENT DOCUMENTS

| | | |
|---|---|---|
| EP | 1158764 A | 11/2001 |
| EP | 1775930 A | 4/2007 |
| EP | 1998547 A | 12/2008 |

OTHER PUBLICATIONS

European Patent Application No. EP 08 16 9761 Search and Examination Report dated Apr. 1, 2009.
European Patent Application No. 08 169 761.7—Examination Report dated Dec. 4, 2009.

* cited by examiner

*Primary Examiner* — Baoquoc N To
(74) *Attorney, Agent, or Firm* — Perry + Currier Inc.

(57) ABSTRACT

A method and apparatus for managing a memory at an electronic device is provided. A first number of new media files that can be stored in the memory in a current format is determined. It is determined if a memory management condition is met. If the memory management condition is met, the current format is setting to a second format such that the memory can store a second number of new media files, if acquired, a given new media file in the second format occupying less of the memory than if the given new media file is in the current format, such that the second number is greater than the first number.

25 Claims, 8 Drawing Sheets

METHOD AND APPARATUS FOR MANAGING MEMORY IN AN ELECTRONIC DEVICE

FIELD

The specification relates generally to electronic devices, and specifically to a method and apparatus for managing memory in an electronic device.

BACKGROUND

The use of digital cameras is ubiquitous, and increasingly digital cameras are being integrated into mobile electronic devices such as PDA's, cell-phones and the like. However, the requirements on the quality of the photos tend to vary within each device. For example, a dedicated digital camera tends to be used in situations where high quality pictures are desired as the pictures can be printed, and even blown up, to be placed in family albums etc. However, digital cameras integrated into mobile electronic devices (including mobile communication devices) tend to be used in spontaneous social and/or work situations where the quality of the picture can be less important than been able to acquire the picture. The situation is exacerbated, as the memory of the mobile electronic device stores data other than pictures, such as e-mails, PIM data, download data, etc., the amount of memory available to store pictures can vary while the device is in operation. While ethnographic data suggests that users of these devices are generally willing to trade off picture quality for number of possible pictures, there will be an expectation of maintaining quality of pictures already acquired. Hence a general problem exists of how to manage the memory of an electronic device as it becomes fill, such that the maximum possible number of pictures can be acquired, while maintaining quality of images already acquired.

BRIEF DESCRIPTIONS OF THE DRAWINGS

Embodiments are described with reference to the following figures, in which.

DETAILED DESCRIPTION OF THE EMBODIMENTS

Figure 1:
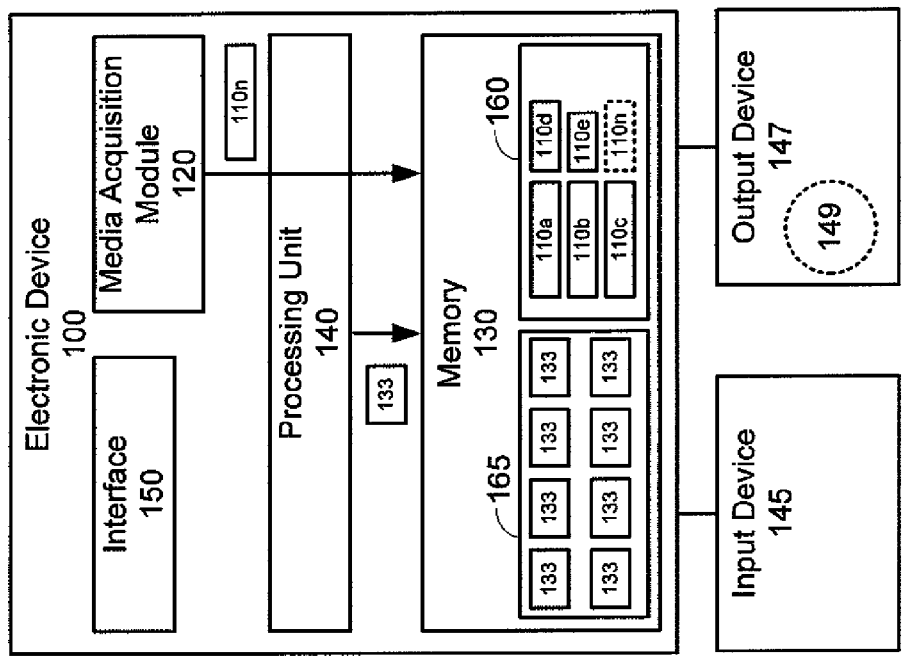
FIGS. 1 and 2 depict an electronic device for acquiring and storing media files, according to non-limiting embodiments.

A first aspect of the specification provides a method for managing a memory at an electronic device. The method comprises determining a first number of new media files that can be stored in the memory in a current format. The method further comprises determining if a memory management condition is met. The method further comprises, if the memory management condition is met, setting the current format to a second format such that the memory can store a second number of new media files, if acquired, a given new media file in the second format occupying less of the memory than if the given new media file is in the current format, such that the second number is greater than the first number. The method can further comprise determining the second number of new media files that can be stored in the memory in the second format.

The memory management condition can comprise at least one of: determining that the first number of new media files is less than a threshold number; determining that an amount of the memory available for storing new media files is less than a threshold value; and determining that the memory is to be managed to store a number of new media files larger than said first number.

The electronic device can be provisioned with the second format as a pre-populated setting.

The memory management condition can comprise receiving an indication that the memory is to be managed in response to controlling a display device, in communication with the electronic device, to generate a representation of at least one of the first number and the second number. The indication can comprise data representative of the second format. The data representative of the second format can comprise data chosen from at least one of a pull down menu and option buttons within the representation. The representation further can comprise a second representation of a new media file in the current format and the second format.

Determining the first number of new media files that can be stored in the memory in the current format can occur in response to at least one of an available amount of memory for storing new media files being less than a threshold value, a low memory condition and the electronic device being turned on.

The new media files can comprise at least one of a picture file, a video file and an audio file.

The new media files in the second format can be at least one of a lower quality than the new media files in the current format and a smaller optical size than new media files in the current format.

A second aspect of the specification provides an electronic device for acquiring and storing media files. The electronic device comprises a media acquisition module for acquiring media files. The electronic device further comprises a memory in communication with the media acquisition module, the memory for storing the media files. The electronic device further comprises a processing unit in communication with the media acquisition module and the memory. The processing unit is enabled for determining a first number of new media files that can be stored in the memory in a current format, when acquired at the media acquisition module. The processing unit is further enabled for determining if a memory management condition is met, such that the memory is to be managed to store a number of new media files larger than the first number. The processing unit is further enabled for, if the memory management condition is met, setting the current format to a second format such that the memory can store a second number of new media files, if acquired, a given new media file in the second format occupying less of the memory than if the given new media file is in the current format, such that the second number is greater than the first number. The processing unit can be further enabled for determining the second number of new media files that can be stored in the memory in the second format. The memory management condition can comprise at least one of determining that the first number of new media files is less than a threshold number and determining that an amount of the memory available for storing new media files is less than a threshold value.

The memory can comprise a pre-populated setting defining the second format.

The electronic device can further comprise a display device, wherein the memory management condition can comprise receiving an indication that the memory is to be managed in response to controlling the display device to generate a representation of at least one of the first number and the second number. The indication can comprise data representative of the second format. The electronic device can further comprise an input device, wherein the data representative of the second format can comprise data chosen from at least one of a pull down menu and option buttons within the representation via interactions with the input device. The representation can comprise a second representation of a new media file in the current format and the second format.

At the processing unit, determining the first number of new media files that can be stored in the memory in the current format can in response to at least one of an available amount of memory for storing new media files being less than a threshold value, a low memory condition and the electronic device being turned on.

New media files acquired at the media acquisition module can comprise at least one of a picture file, a video file and an audio file. New media files in the second format can be at least one of a lower quality than the new media files in the current format and a smaller optical size than new media files in the current format.

The electronic device can further comprise an input device and an output device. The electronic device can comprise at least one of a mobile electronic device and a digital camera.

A third aspect of the specification provides a computer-readable storage medium having computer readable code embodied therein, the code being executable by a computing device for implementing a method for managing a memory at an electronic device. The method comprises determining a first number of new media files that can be stored in the memory in a current format. The method further comprises determining if a memory management condition is met, such that the memory is to be managed to store a number of new media files larger than the first number. The method further comprises, if the memory management condition is met, setting the current format to a second format such that the memory can store a second number of new media files, if acquired, a given new media file in the second format occupying less of the memory than if the given new media file is in the current format, such that the second number is greater than the first number.

FIG. 1 depicts an electronic device 100 for acquiring and storing media files 110a, 110b, ... 110n (collectively media files 110 and generically a media file 110), according to a non-limiting embodiment. Media files 110 can include any suitable media file including, but not limited to, picture data, video data, audio data and/or a combination. The electronic device 100 comprises a memory 130 for storing data including, but not limited to, the media files 110. The electronic device 100 further comprises a processing unit 140 (or processor) enabled to manage the memory 130. The electronic device 100 further comprises a media acquisition module 120 enabled for acquiring the media files 110, for example a newly acquired media file 110n, and can include a still digital camera, a digital video camera, a microphone or a combination. The media acquisition module 120 can comprise a combination of hardware (e.g. lenses, CCD, microphone etc.) and software for processing the media files 110, as desired. In some embodiments, processing of media files 110 can be shared between the media acquisition module 120 and the processing unit 140. In other words, in the normal operation of the electronic device 100, media files 110 can be acquired at the media acquisition module 120, optionally processed by the processing unit 140, and stored in the memory 130.

The electronic device 100 is generally in communication with an input device 145 for accepting input. The input device 145 can comprise any suitable combination of keyboard, pointing device, trackball, touch screen, input buttons, and the like. The electronic device 100 is in further communication with an output device 147 for outputting media data when a media file 110 is played. For example, the output device 147 can comprise any suitable combination of display device, for example a CRT and/or a flat panel display (e.g. LCD, plasma, OLED and the like), a speaker, and the like. In embodiments where the output device 147 comprises a display device, the display device can be controlled to generate a representation 149 of format options available for acquiring new media files 110n at the electronic device 100, as described below.

In some embodiments, the electronic device 100 comprises the input device 145 and the output device 147.

In some embodiments, the electronic device 100 comprises a digital camera. In other embodiments, the electronic device 100 comprises an audio recorder, including a digital audio recorder. In yet further embodiments, the electronic device 100 comprises a mobile electronic device with an integrated digital camera and/or an integrated audio recorder.

In some embodiments, the electronic device 100 further comprises a communications interface 150. In some embodiments, the communications interface 150 enables the electronic device 100 to communicate with a computing device (not depicted) such that the media files 110 can be transmitted to the computing device. In these embodiments, the communications interface 150 can comprise any suitable combination of serial and/or parallel data ports including, but not limited to, a USB port, a Firewire port, and the like. For example, in embodiments where the electronic device 100 comprise a digital camera and/or a digital audio recorder, the communication interface 150 enables a user to retrieve the media files from the electronic device 100. In some embodiments, the communications interface 150 can be further enabled for wireless communication with the computing device using any suitable communication protocol (e.g. Bluetooth, WiFi, WiMax, cell phone protocols and/or a combination).

In some embodiments, the communications interface 150 enables the electronic device 100 to communicate via a communication network (not depicted) in a wired or wireless manner as desired, using any suitable protocol (e.g. Internet protocols, PSTN protocols, Bluetooth, WiFi, WiMax, cell phone protocols and/or a combination). In these embodiments, the electronic device 100 can be further enabled to receive and store data from the communications network. The electronic device 100 can be further enabled to process received data and/or transmit data over the communications network. For example, in embodiments where the electronic device 100 comprises a mobile electronics device such as a PDA and/or a cell phone, the electronic device 100 can be enabled to receive and store e-mail, which can include attachments, such that the memory 130 stores not only media files 110 but also other data 133. For example, in some embodiments, the media files 110 can be stored in a portion 160 of the memory 130 while the other data 133 can be stored in a portion 165 of the memory 130. Each portion 160 and 165 can be contiguous or distributed, as desired. Furthermore, each portion 160 and 165 can be a fixed or variable size, as desired.

Similarly, in some embodiments, the electronic device 100 is enabled to process applications such as e-mail applications, scheduling applications, browser applications, and the like, with each application causing the other data 133 stored in the memory 130 to increase and/or decrease, independent of the media files 110 stored in the memory 130.

Furthermore, in some embodiments, the electronic device 100 can acquire and/or generate the other data 133 via a communication network and/or via the input device 145 and/or during general processing of other data 133 already stored in memory 130 and/or during general processing applications. Hence, the portion 160 of the memory 130 where newly acquired media files 110n can be stored can decrease over the normal operation of the electronic device 110, by storing newly acquired media files 110 and/or by storing the other data files 133.

In embodiments where the portions 160 and 165 are variable, the portion 160 of the memory 130 which is available to store new media files 110n acquired at the media acquisition module 120, can vary during the course of the normal operation of the electronic device 100 as the portion 165 increases or decreases.

In embodiments where the portion 160 is a fixed size, the amount of the portion 160 available to store new media files 110 will decrease as the media files 110 are acquired.

In some embodiments, the processing unit 140 and/or the media acquisition module 120, alone or in combination, are enabled to process media files 110 acquired at the media acquisition module 120 prior to being stored in the memory 130. In particular, the processing unit 140 and/or the media acquisition module 120 are enabled to process the media files 110 into various formats, including but not limited to a current format and at least a second format, wherein a given media file 110 in the at least a second format occupies less of the memory 130 than if the given media file were in the current format. For example, in FIG. 1, media files 110a, 110b and 110c are in a current format and media file 110d is in a second format that occupies less of the memory 130 than if the media file 110d were in the current format. Furthermore, media file 110e is in a third format that occupies less of the memory 130 than if the media file 110d were in the second format. The newly acquired media file 110n is depicted as being in the current format upon acquisition, but then later stored in the memory 130 in the second format, for example after processing by the processing unit 140. In general, in present embodiments, the electronic device 100 is enabled to process and store the media files 110 in at least two formats; however, the number of formats is not otherwise to be considered particularly limiting.

In some embodiments, a media file 110 in the current format can be of a higher quality (e.g. higher pixel density etc.) than a media file 110 in the second format. In other embodiments, a media file 110 in the current format can be of a larger optical size (e.g. larger area when printed and/or viewed etc.; the optical size can be represented in terms of # of pixels in the X and Y directions, such as 1600×1200) than a media file 110 in the second format, though a similar quality. In any event, a media file 110 in the current format is generally larger than a media file 110 in the second format 110. However different media files 110 in a given format are not necessarily all the same size: different media files 110 in a given format can vary with respect amount of the memory 130 that is occupied by each, based on the amount of data stored in each media file 110.

In some embodiments, when a media file 110 is acquired at the media acquisition module 120, the media file 110 can initially be in a raw format, as known to persons of skill in the art, and the processing unit 140 and/or the media acquisition module 120 processes the media file 110 into a desired format.

In some embodiments, the processing unit 140 is enabled to control the media acquisition unit 120 to acquire media files 110 in a given format (i.e. the current format or the second format) such that if one format is desired over another format, further processing of the media file 110 by the processing unit 140 does not necessarily occur after acquisition.

In the prior art, the format into which a media file 110 is processed into and/or stored is determined via either default settings stored in the memory 130 and/or set-format data received via the input device 145. For example, the electronic device 100 can be provisioned with default settings such that all media files 110 acquired in a format dictated by the default settings, unless the set-format data is received via the input device 145: e.g. a user can interact with the input device 145 to either change the default settings or change the format of a particular media file 110 either before or after acquisition by entering the set-format data into the input device 145. In this manner the memory 130 can be manually managed.

However, in present embodiments, the electronic device 110 is enabled to manage the memory 130 by: determining a first number of new media files 110n that can be stored in the memory 130 in a current format; determining if a memory management condition is met, such the memory 130 is to be managed to store a number of new media files 110n larger than the first number; and, if the memory management condition is met, setting the current format to a second format such that the memory 130 can store a second number of new media files 110n, if acquired, a given new media file 110n in the second format occupying less of the memory 130 than if the given new media file 110n is in the current format.

Figure 2:
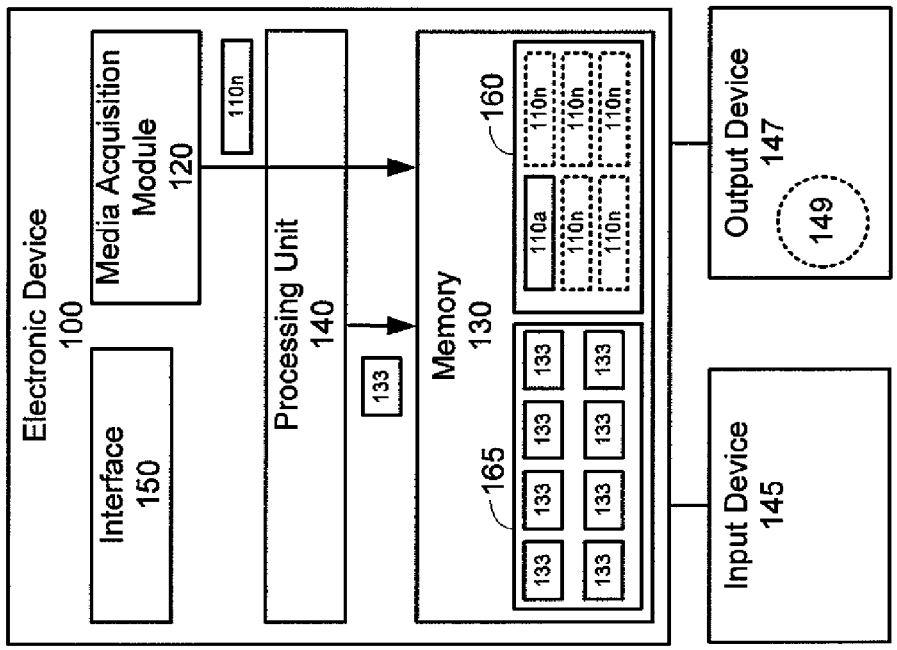

To illustrate a situation where the electronic device 100 manages the memory 130 to increase the number of media files 110 that can be stored in the memory 130, attention is now directed to FIG. 2 which is substantially similar to FIG. 1, with like elements having like numbers. However, in FIG. 2, the portion 160 comprises the already acquired media file 110a, stored in a current format. Furthermore, the memory 130 is relatively full of both other data 133 and the already acquired media file 110a. Hence, there is only enough room in the memory 130 for a given number new media files 110n, for example five new media files 110n, if the new media files 110n are stored in the current format. However, in these embodiments, the given number of new media files 110n is not a sufficient number, and it is desirable to change the format of newly acquired media files 110n from the current format to a second format, without affecting the format of the already acquired media files 110, for example the media file 110a.

Figure 3:
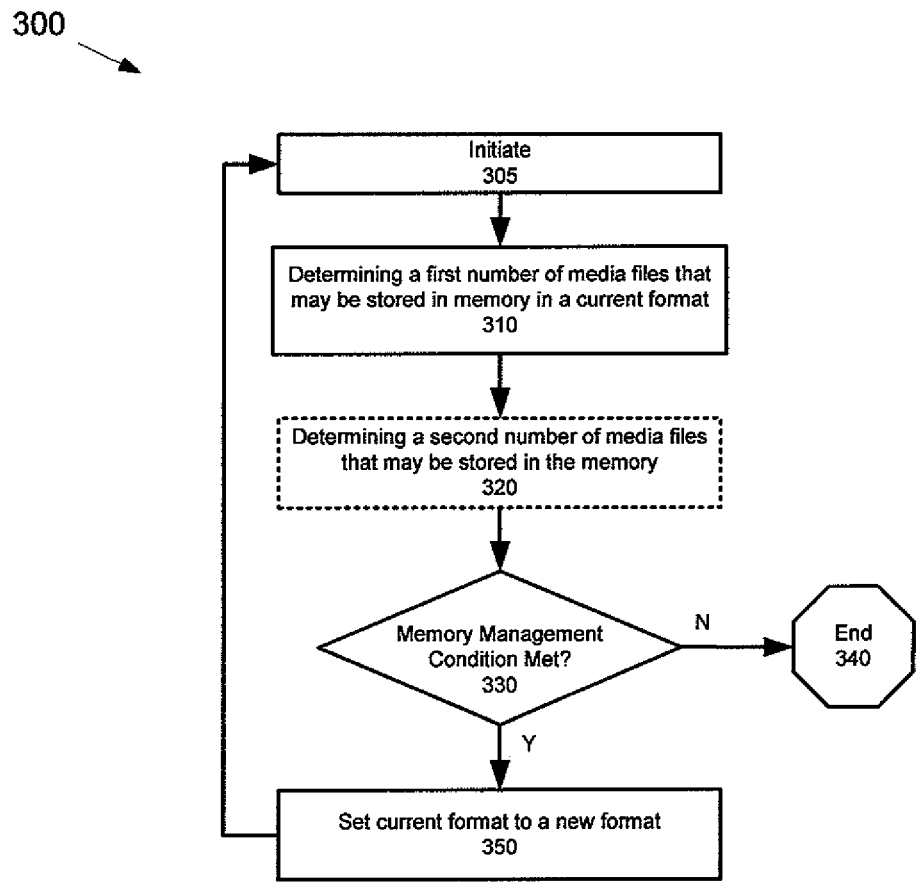
FIG. 3 depicts a method of managing memory at an electronic device, according to a non-limiting embodiment.

Hence, the electronic device 100 implements a method 300 for managing the memory 130, as depicted in FIG. 3, according to a non-limiting embodiment. In order to assist in the explanation of the method 300, it will be assumed that the method 300 is performed using the electronic device 100. Furthermore, the following discussion of the method 300 will lead to a further understanding of the electronic device 100 and its various components. However, it is to be understood that the electronic device 100 and/or the method 300 can be varied, and need not work exactly as discussed herein in conjunction with each other, and that such variations are within the scope of present embodiments. In embodiments, the method 300 can be performed by the processing unit 130, the media acquisition module 120, or a combination.

At step 305, the method 300 is initiated by the processing unit 130, the media acquisition module 120, or a combination. The method 300 can be initiated when the electronic device 100 is turned on, when an available amount of the memory 130 for storing new media files 110n is less than a free memory threshold value, when a low memory condition occurs at the electronic device 100 and/or when initiated via input data received at the input device 145. The free memory threshold value can be any value below which any new data (including, but not limited to, new media files 110n and/or other data 133) acquired by the electronic device 100 can not be stored in the memory 130 due to lack of available free memory. The free memory threshold value can be determined by an administrator. A low memory condition can be any condition whereby new data (including, but not limited to, new media files 110n and/or other data 133) acquired by the electronic device 100 can not be stored in the memory 130 due to lack of available free memory.

At step 310, a first number of new media files 110n that can be stored in the memory 130 in a current format is determined. In some embodiments, the current format can be a default format. The first number of new media files 110n that can be stored in the memory 130 in the current format can be determined by determining the amount of the memory 130 that is available for storing new media files 110n (that is, media files 110 that have yet to be acquired) and a size of a new media file 110 in the current format. In some embodiments, the amount of memory 130 that is available for storing new media files 110n comprises the amount of the memory 130 available for storing data in general (e.g. the total amount of free memory 130). In embodiments where the portion 160 is a fixed size, dedicated to storing media files 110, the amount of memory 130 that is available for storing new media files 110n comprises the amount of the portion 160 which is free.

In some embodiments, the size of a new media file 110 in the current format can be stored in the memory 130 (e.g. in the other data 133) and hence the size of a new media file 110 in the current format can be determined by retrieving the size from the memory 130. For example, the electronic device 110 can comprise a plurality of different settings, each of which affects the size of a new media file 110, by adjusting the format and/or quality of a new media file 110, as described above. Each given combination of settings can result in a different size for a new media file 110, if the default setting is changed to the given combination. Hence, in some embodiments, the median size of a new media file 110 for each combination can be stored in the memory 130.

In other embodiments, the size of a new media file 110 in the current format can be determined by processing the current media files 110 in the current format stored in the memory 130 to determine an average or maximum size; the size of a new media file 110 in the current format is then determined to be one of the average size or the maximum size.

Hence, the first number of new media files 110n that can be stored in the memory 130 in a current format can be determined by dividing the amount of memory 130 that is available for storing new media files 110n by the size of a new media file 110n in the current format, and rounding down to the nearest integer. For example if the amount of memory 130 that is available for storing new media files 110n is 10.75 MB and the size of a new media file 110n in the current format is 2.12 MB, the first number of new media files 110n that can be stored in the memory 130 in a current format is five new media files 110n (i.e. 10.75÷2.12, rounded down), after which there would not be enough of the memory 110 available left to store a sixth new media file 110n.

In an alternative step 320, a second number of new media files 110n that can be stored in the memory 130 in a second format is determined, a given new media file 110n in the second format occupying less of the memory 130 than if the given new media file 110n is in the current format. The second number of new media files 110n that can be stored in the memory 130 in the second format can be determined in a manner similar to determining the first number: by determining the amount of the memory 130 that is available for storing new media files 110n (that is, media files 110 that have yet to be acquired) and dividing by a size of a new media file 110 in the second format. The size of a new media file 110n in the second format can be determined in a manner similar to determining the size of a new media file 110n in the current format, as described above (e.g. the size of a new media file 110n in the second format can be stored in the memory 130 or determined via existing media files 110 in the second format stored in the memory 130). Continuing with the example above, if the amount of memory 130 that is available for storing new media files 110n is 10.75 MB and the size of a new media file 110n in the second format is 0.48 Mb MB, the second number the first number of new media files 110n that can be stored in the memory 130 in the second format is twenty-two new media files 110n (i.e. 10.75÷0.48, rounded down).

In some embodiments, before during or after alternative step 320, additional numbers of new media files 110n that can be stored in the memory 130 in additional formats is determined, a given new media file 110n in the additional format occupying less of the memory 130 than if the given new media file 110n is in the current format. The additional numbers of new media files 110n that can be stored in the memory 130 in the additional formats can be determined in a manner similar to determining the first number and the second number. For example, if the amount of memory 130 that is available for storing new media files 110n is 10.75 MB and the size of a new media file 110n in the another format is 0.2 Mb MB, the second number the first number of new media files 110n that can be stored in the memory 130 in a current format is fifty-three new media files 110n (i.e. 10.75÷0.2, rounded down).

At step 330, it is determined if a memory management condition is met, such the memory 130 is to be managed to store a number of new media files 110n larger than the first number. In some embodiments, the memory management condition comprises the first number of new media files 110n being less than a threshold number. For example, if there is enough of the memory 130 available to store five new media files 110n, but the threshold number is any number greater than five, then the memory management condition is met. In other embodiments, the memory management condition comprises the amount of the memory 130 available for storing new media files being less than a threshold value. For example, if the amount of the memory 130 available to new media files 110n is 10.75 MB, but the, but the threshold value is any value greater than 10.75 MB, then the memory management condition is met.

In a particular non-limiting embodiment, memory management condition comprises receiving an indication that the memory 130 is to be managed, for example via the input device 145. In these embodiments, when the output device 147 comprises a display device, the method can further comprise controlling the display device to generate the representation 149, wherein the representation 149 comprises at least one of the first number and the second number. Furthermore, receiving the indication that the memory 130 is to be managed occurs in response to controlling the display device to generate the representation 149.

The representation 149 can be configured in any suitable manner. FIGS. 4 through 7 depict various non-limiting embodiments of the representation 149: representation 149a, representation 149b, representation 149c and representation 149d, described hereafter. Each the representations 149a-

149*d* comprise a Graphic User Interface (GUI) displayed at the display device in a specific exemplary embodiment where the electronic device 100 comprises a mobile electronic device enabled to send and receive e-mail, the mobile electronic device comprising a digital camera. Hence the media files 110, in this embodiment, comprise any suitable picture data in any suitable format (i.e. picture files, such as jpegs, tiffs, bitmaps and the like).

Figure 4:
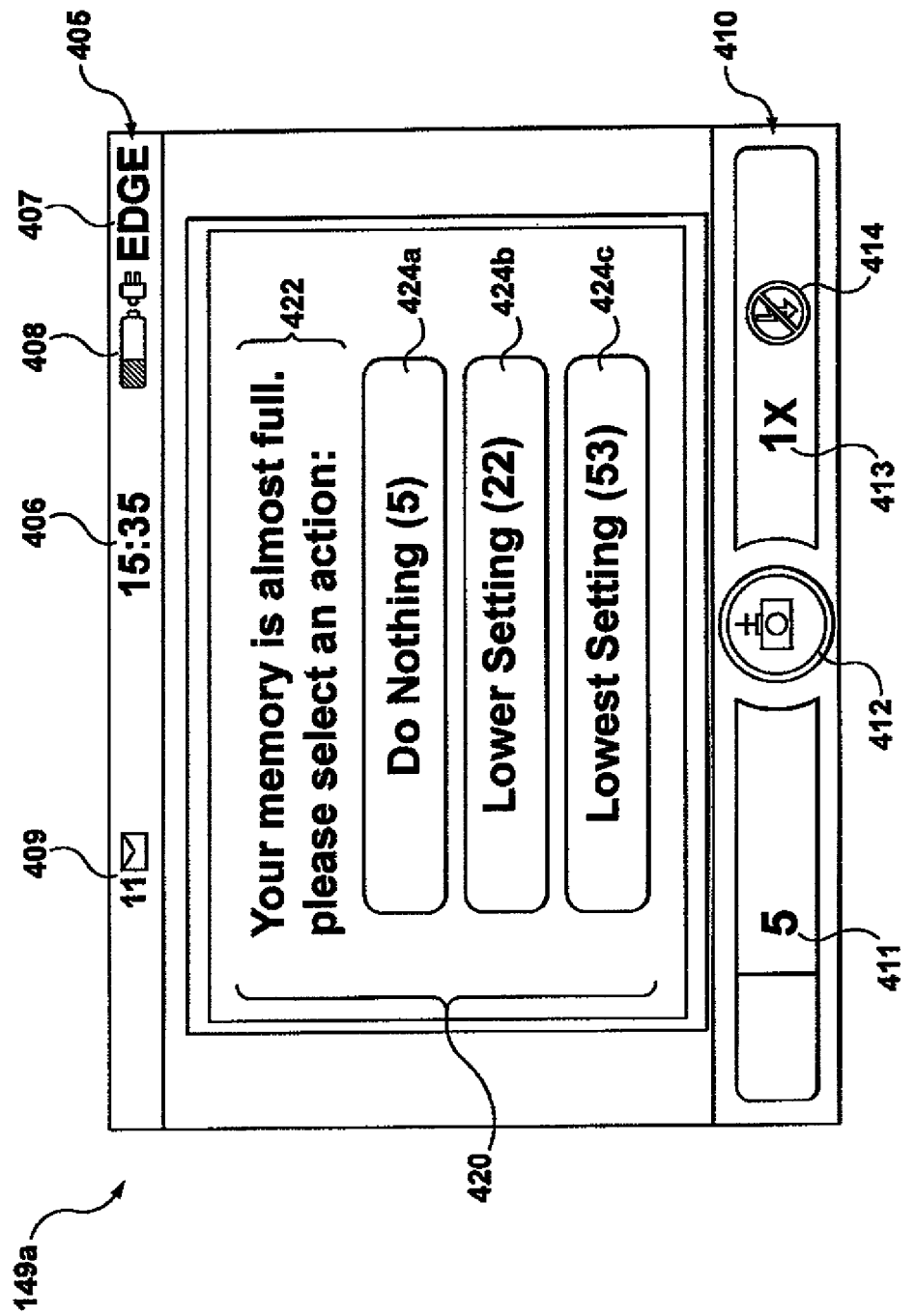
FIGS. 4 through 7 depict representations of format options available for acquiring new media files at the electronic device, as displayed on a display device, according to non-limiting embodiments.

Attention is now directed to FIG. 4 which depicts the representation 149*a*, according to a non-limiting embodiment. The representation 149*a* includes a network information bar 405 that includes representations of the current time 406, network type 407, network strength 408 and the number of unread e-mails 409. However the presence, absence or position of the network information bar 405 is not to be considered particularly limiting. Furthermore, the information included in the network information bar 405 is not to be considered particularly limiting.

The representation 149*a* further includes a camera information bar 410 that includes representations of the number of new media files 110*n* in a current format that can be acquired 411, a camera icon 412 indicative that that the electronic device 100 is currently in a camera mode, the current zoom 413 of the digital camera, and an icon 414 representative of the current flash condition of the digital camera. However the presence, absence or position of the camera information bar 410 is not to be considered particularly limiting. Furthermore, the information included in the camera information bar 410 is not to be considered particularly limiting.

The representation 149*a* further comprises information 420 representative of options available when the memory 130 is in a low memory condition and/or the amount of free memory 130 falls below a free memory threshold value, as described above. In some embodiments the information 420 comprises a message 422 indicative of a low memory condition and a prompt to choose an option ("Your memory is almost full, please select on option"). The information 420 further comprises at least one option button 4424*a*, 424*b* and 424*c* (collectively, option buttons 424, and generically an option button 424), for selecting a memory management option. Each option button 424 comprises an indication of the number of new media files 110*n* that can be acquired and stored by the electronic device 100 if the if the option button 424 is selected: 5 in 424*a*, 22 in 424*b* and 53 in 424*c*. Each option button further comprises an indication of the resulting effect on the new media files 110*n* if the option is selected: "Do nothing" in 424*a* (i.e. no effect), "Lower Setting" in 424*b* (i.e. new media files 110*a* will be of a lower quality and/or a smaller optical size than the option represented by 424*a*), and "Lowest Setting" 424*c* (i.e. new media files 110*a* will be of a lower quality and/or a smaller optical size than the option represented by 424*b*).

Each option button 424 is enabled to be activated via an interaction with the input device 145. Hence, if the activation of the option button 424*a* is detected, the memory management condition is not met, as new media files 110*n* are to be stored in the current format. However, if the activation of the option button 424*b* or the option button 424*b* is detected, the memory management condition is met, as new media files 110*n* are to be stored in the second or third formats.

The number of option buttons 424 is not to be considered particularly limiting, with the number of option buttons 242 representative of a given number of format options that are being made available via the representation 149*a*. However, more format options can be available than are being made available via the option buttons 424, the number of format options being suitable to the functionality of the electronic device 100 and/or the media acquisition module 120.

Figure 5:
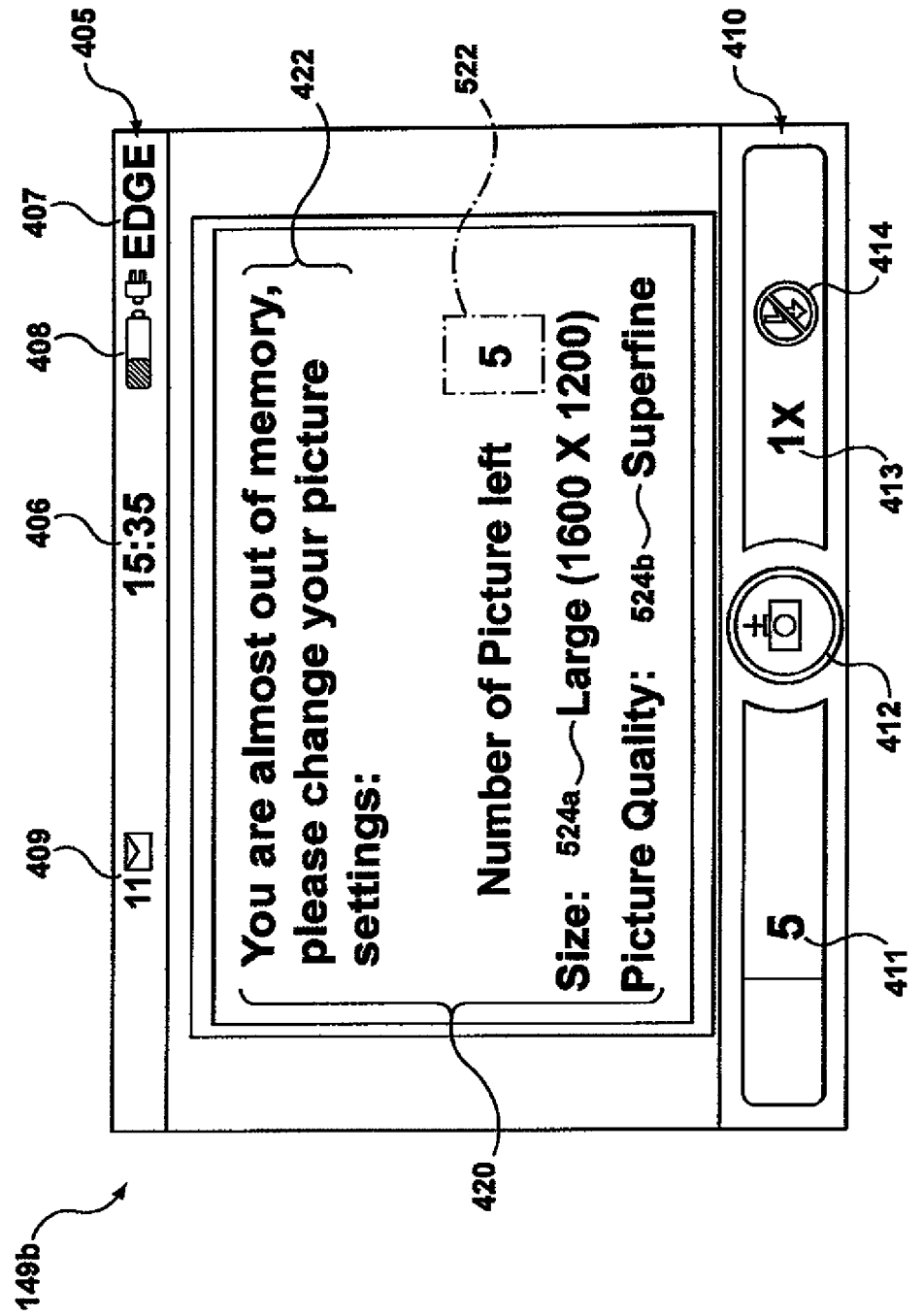

Attention is now directed to FIG. 5, which is substantially similar to FIG. 4, with like elements having like numbers, FIG. 5 depicting the representation 149*b*, according to a non-limiting embodiment. The representation 149*b* comprises an indication 522 of the number of new media files 110*n* that can be acquired and stored by the electronic device 100 in the current format: "Number of Pictures left 5". The representation 149*b* farther comprises pull down menus 524*a* and 524*b* for changing the format of the new media files 110*n*, if acquired. For example, pull down menu 524*a* initially displays the current size of a new media file 110*n*, if acquired: "Large (1600×1200)", where 1600×1200 indicated the number of pixels in the X and Y directions respectively. If pull down menu 524*a* is selected, for example via the input device 145, other format options are displayed for selection, wherein each of the format options represent at least the second format, described above. Similarly, pull down menu 524*b* initially displays the current quality of a new media file 110*n*, if acquired: "Superfine", according to a provisioned setting. If pull down menu 524*b* is selected, for example via the input device 145, other format options are displayed for selection, wherein each of the format options represent at least the second format, described above. Hence, by interacting with, and selecting options from, each of the pull down menus 542*a* and 542*b*, the second format can be determined.

If the current format options in each of the pull down menus 524*a* and 524*b* are selected, then the memory management condition is not met. However, if format options other than the current format options are selected, then the memory management condition is met, as new media files 110*n* are to be stored in the alternative formats.

The number of format options available via each pull down menu 524 is not to be considered particularly limiting, with the number of format options representative of a given number of format options that are being made available via the representation 149*b*. However, more format options can be available than are being made available via the pull down menu 524, the number of format options being suitable to the functionality of the electronic device 100 and/or the media acquisition module 120.

Figure 6:
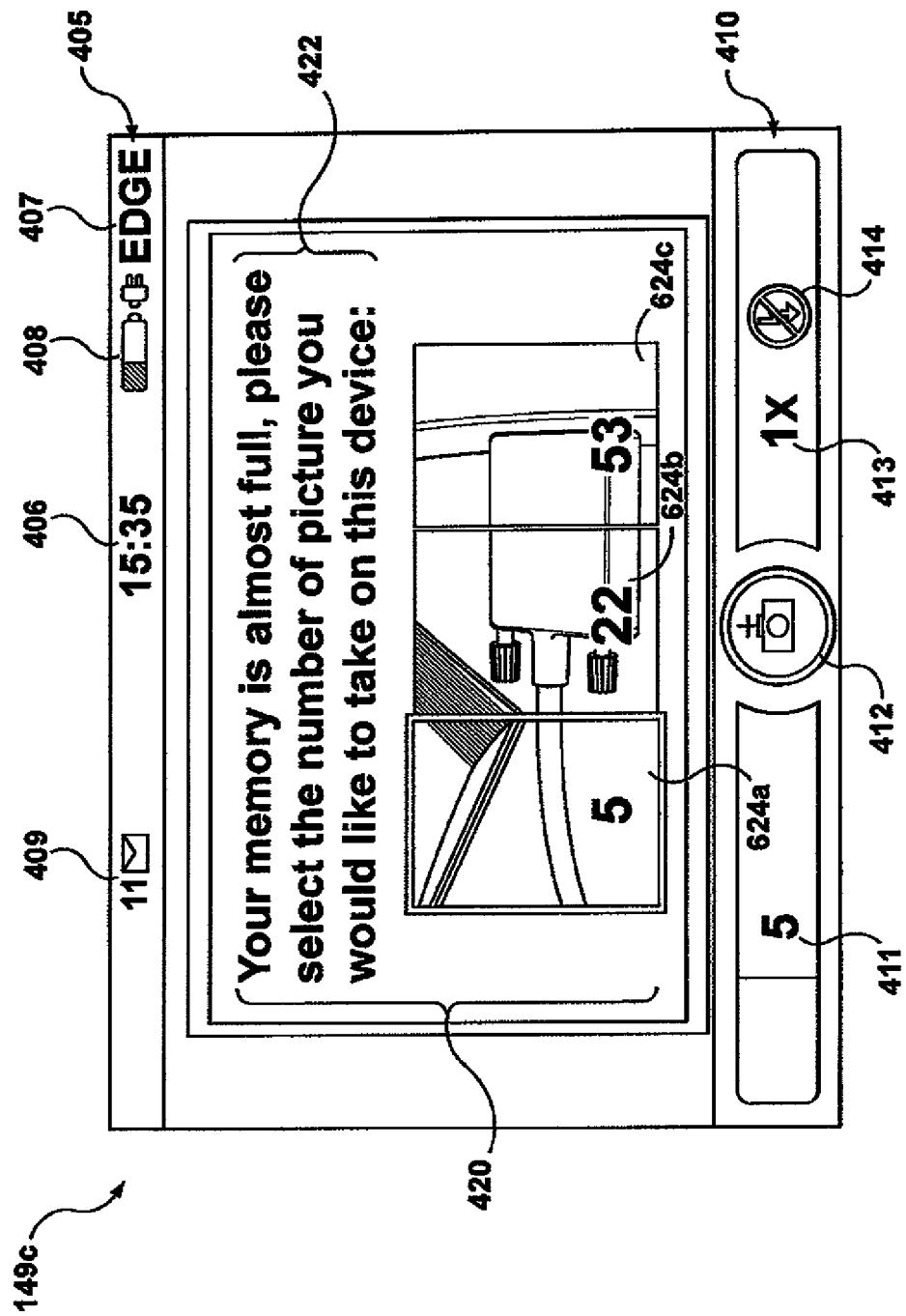

Attention is now directed to FIG. 6, which is substantially similar to FIG. 4, with like elements having like numbers, FIG. 6 depicting the representation 149*c*, according to a non-limiting embodiment. The representation 149*c* comprises at least one option button 624*a*, 624*b* and 624*c* (collectively, option buttons 624, and generically an option button 624), for selecting a memory management option. Each option button 624 comprises an indication of the number of new media files 110*n* (depicted in FIG. 6 as number of pictures) that can be acquired and stored by the electronic device 100 if the option button 624 is selected: 5 in 624*a*, 22 in 624*b* and 53 in 624*c*. Each option button further comprises a visual indication of the resulting effect on the quality new media files 110*n* if the option is selected. For example the option button 624*a* comprises a visual indication of the quality a given media file 110 in the current format. The option button 624*b* comprises a visual indication of the quality of the same given media file 110, but in the second format, to indicate that the quality of new media files 11*n* will be lower than in the current format. Similarly, the option button 624*c* comprises a visual indication of the quality of the same given media file 110, but in a third format, to indicate that the quality of new media files 11*n* will be lower than in the second format.

Each option button 624 is enabled to be activated via an interaction with the input device 145. Hence, if the activation of the option button 624*a* is detected, the memory management condition is not met, as new media files 110*n* are to be stored in the current format. However, if the activation of the option button 624*b* or the option button 624*b* is detected, the memory management condition is met, as new media files 110*n* are to be stored in the second or third formats.

The number of option buttons 624 is not to be considered particularly limiting, with the number of option buttons 624 representative of a given number of format options that are being made available via the representation 149*b*. However, more format options can be available than are being made available via the option buttons 624, the number of format options being suitable to the functionality of the electronic device 100 and/or the media acquisition module 120.

Figure 7:
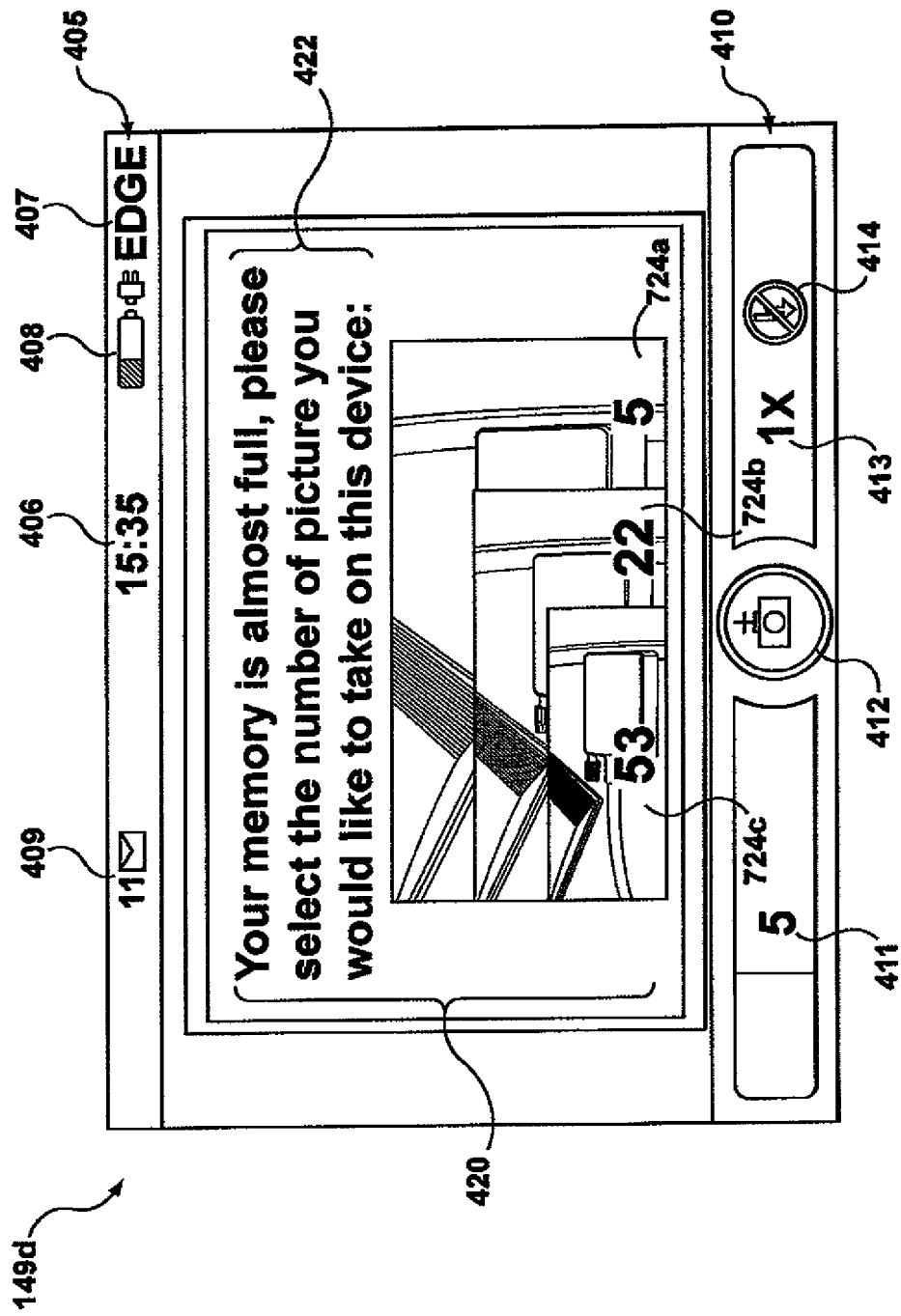

Attention is now directed to FIG. 7, which is substantially similar to FIG. 4, with like elements having like numbers, FIG. 7 depicting the representation 149*d*, according to a non-limiting embodiment. The representation 149*d* comprises at least one option button 724*a*, 724*b* and 724*c* (collectively, option buttons 724, and generically an option button 724), for selecting a memory management option. Each option button 724 comprises an indication of the number of new media files 110*n* (depicted in FIG. 7 as number of pictures) that can be acquired and stored by the electronic device 100 if the option button 724 is selected: 5 in 724*a*, 22 in 724*b* and 53 in 724*c*. Each option button further comprises a visual indication of the resulting effect on the relative size of new media files 110*n* if the option is selected. For example the option button 724*a* comprises a visual indication of the relative size a given media file 110 in the current format (i.e. the current format). The option button 724*b* comprises a visual indication of the relative size of the same given media file 110, but in the second format, to indicate that the size of new media files 11*n* will be smaller than in the current format. Similarly, the option button 724*c* comprises a visual indication of the relative size of the same given media file 110, but in a third format, to indicate that the size of new media files 11*n* will be smaller than in the second format.

Each option button 724 is enabled to be activated via an interaction with the input device 145. Hence, if the activation of the option button 724*a* is detected, the memory management condition is not met, as new media files 110*n* are to be stored in the current format. However, if the activation of the option button 724*b* or the option button 724*b* is detected, the memory management condition is met, as new media files 110*n* are to be stored in the second or third formats.

The number of option buttons 724 is not to be considered particularly limiting, with the number of option buttons 724 representative of a given number of format options that are being made available via the representation 149*b*. However, more format options can be available than are being made available via the option buttons 724, the number of format options being suitable to the functionality of the electronic device 100 and/or the media acquisition module 120.

Returning now to FIG. 3, if the memory management condition is not met at step 330, then the method 300 ends at step 340 and any new media files 110*n* that are acquired are stored in the current format.

However, if the memory management condition is met at step 330, then the current format is set to a second format at step 350, in which new media files 110*n* occupy less of the memory 130, if acquired, than if in the current format. For example, in embodiments where the memory management condition comprises the first number of new media files 110*n* being less than a threshold number and/or the amount of the memory 130 available for storing new media files being less than a threshold value, the second format can be a pre-determined second format, as set determined by an administrator of the electronic device 100. However, in embodiments where the memory management condition is met via interactions with the representation 149, the second format comprises the format determined via the interactions with the representation 149.

In some embodiments, the method 300 can be reinitiated at step 305, for example, when an available amount of the memory 130 for storing new media files 110*n* is less than a second free memory threshold value, or when a second low memory condition occurs at the electronic device 100 and/or when initiated via input data received at the input device 145. In these embodiments, the current format can again be set to a new second format in which a given new media file 110*n* in the new second format occupies less of the memory 130 than if the same given new media file 110*n* is in the current format. Furthermore, new a threshold value for free memory and/or a new threshold for the number of new media files 110*n* that can be acquired can be applied at step 330.

Figure 8:
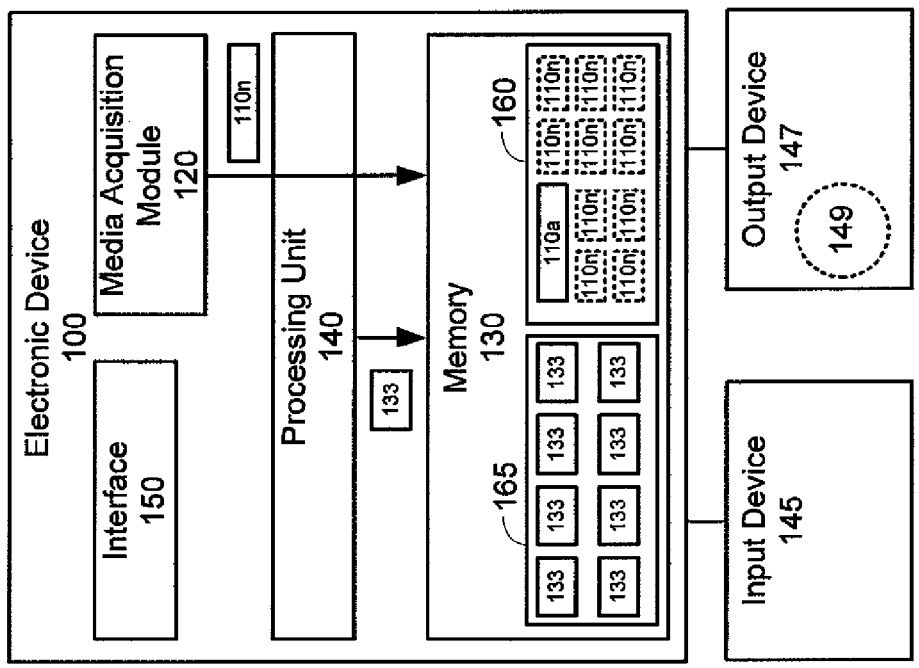
FIG. 8 depicts an electronic device for acquiring and storing media files, according to non-limiting embodiments.

In any event, when the method 300 is performed, any new media files 110*n* that are acquired by the electronic device 100 are stored in a new format, without affecting the format of previously stored media files 110, and furthermore the number of new media files 110*n* that can be acquired by electronic device 100 is increased. This situation is illustrated in FIG. 8, which is substantially similar to FIG. 2, with like elements depicted with like numbers. However, in FIG. 8, the method 300 has been performed and the memory management condition has been met at step 300. Hence, in comparison with FIG. 2, the number of new media files 110*n* that can be stored in the memory 130 has increased from 5 to 10, the format of new media files 110*n* acquired in FIG. 8 being smaller than the format of new media files 110*n* acquired in FIG. 2.

Hence, present embodiments can generally manage memory 130 as it becomes full, such that new media files 110*n* can be acquired while maintaining quality of already acquired media files 110 (e.g. media files 110*a*, 110*b*, 110*c*), and further without affecting already acquired media files 110. Furthermore, options can be provided which can enable management of memory 130 for storing a preferred number of new media files 110*n* in a second format, prior to acquisition of new media files 110*n*. This can provide previously unavailable flexibility in managing memory 130, in preparation for acquiring new media files 110*n*, rather than managing memory 130 upon or during acquisition of new media files 110*n*. Indeed, managing memory 130 upon or during acquisition of new media files 110*n* can be generally undesirable, for example if electronic device 100 is to be operated in an automatic acquisition mode (e.g. timed acquisition of multiple new media files 110*n*, such as when a digital camera is in a time lapse acquisition mode, in which multiple pictures are automatically acquired one after the other). Present embodiments prepare electronic device 100 for operation in such an automatic acquisition mode by managing memory 130 prior to acquiring new media files 110*n*, such that memory 130 does not become full during operation in the automatic acquisition mode.

Those skilled in the art will appreciate that in some embodiments, the functionality of the media acquisition module 120 and the processing unit 140 can be implemented using pre-programmed hardware or firmware elements (e.g., application specific integrated circuits (ASICs), electrically erasable programmable read-only memories EEPROMs), etc.), or other related components. In other embodiments, the functionality of the media acquisition module 120 and the processing unit 140 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

A portion of the disclosure of this patent document contains material which is subject to copyright protection. The copyright owner has no objection to the facsimile reproduction by any one the patent document or patent disclosure, as it appears in the Patent and Trademark Office patent file or records, but otherwise reserves all copyrights whatsoever.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A method for managing a memory at an electronic device comprising:
    determining a first number of new media files that can be stored in the memory in a current format;
    determining when a memory management condition is met; and,
    when said memory management condition is met, setting said current format to a second format such that the memory can store a second number of new media files, when acquired, a given new media file in said second format occupying less of the memory than when said given new media file is in said current format, such that said second number is greater than said first number.

2. The method of claim 1, further comprising determining said second number of new media files that can be stored in the memory in said second format.

3. The method of claim 1, wherein said memory management condition comprises at least one of: determining that said first number of new media files is less than a threshold number; determining that an amount of the memory available for storing new media files is less than a threshold value; and determining that the memory is to be managed to store a number of new media files larger than said first number.

4. The method of claim 1, wherein the electronic device is provisioned with said second format as a pre-populated setting.

5. The method of claim 1, wherein said memory management condition comprises receiving an indication that the memory is to be managed in response to controlling a display device, in communication with said electronic device, to generate a representation of at least one of said first number and said second number.

6. The method of claim 5, wherein said indication comprises data representative of said second format.

7. The method of claim 6, wherein said data representative of said second format comprises data chosen from at least one of a pull down menu and option buttons within said representation.

8. The method of claim 5, wherein said representation further comprises a second representation of a new media file in said current format and said second format.

9. The method of claim 1, wherein said determining said first number of new media files that can be stored in the memory in said current format occurs in response to at least one of an available amount of memory for storing new media files being less than a threshold value, a low memory condition and the electronic device being turned on.

10. The method of claim 1, wherein said new media files comprise at least one of a picture file, a video file and an audio file.

11. The method of claim 1, wherein said new media files in said second format are at least one of a lower quality than said new media files in said current format and a smaller optical size than new media files in said current format.

12. An electronic device for acquiring and storing media files, comprising:
    a media acquisition module for acquiring media files;
    a memory in communication with said media acquisition module, said memory for storing said media files, said memory;
    a processing unit in communication with said media acquisition module and said memory, said processing unit enabled for:
    determining a first number of new media files that can be stored in said memory in a current format, when acquired at said media acquisition module;
    determining when a memory management condition is met, such that the memory is to be managed to store a number of new media files larger than said first number; and,
    when said memory management condition is met, setting said current format to a second format such that said memory can store a second number of new media files, when acquired, a given new media file in said second format occupying less of said memory than when said given new media file is in said current format, such that said second number is greater than said first number.

13. The electronic device of claim 12, said processing unit further enabled for determining said second number of new media files that can be stored in said memory in said second format.

14. The electronic device of claim 12, wherein said memory management condition comprises at least one of determining that said first number of new media files is less than a threshold number and determining that an amount of said memory available for storing new media files is less than a threshold value.

15. The electronic device of claim 12, said memory comprising a pre-populated setting defining said second format.

16. The electronic device of claim 12, further comprising a display device, wherein said memory management condition comprises receiving an indication that said memory is to be managed in response to controlling said display device to generate a representation of at least one of said first number and said second number.

17. The electronic device of claim 16, wherein said indication comprises data representative of said second format.

18. The electronic device of claim 17, further comprising an input device, wherein said data representative of said second format comprises data chosen from at least one of a pull down menu and option buttons within said representation via interactions with said input device.

19. The electronic device of claim 16, wherein said representation comprises a second representation of a new media file in said current format and said second format.

20. The electronic device of claim 12, wherein said determining said first number of new media files that can be stored in said memory in said current format occurs in response to at least one of an available amount of memory for storing new media files being less than a threshold value, a low memory condition and the electronic device being turned on.

21. The electronic device of claim 12, wherein said new media files comprise at least one of a picture file, a video file and an audio file.

22. The electronic device of claim 12, wherein said new media files in said second format are at least one of a lower quality than said new media files in said current format and a smaller optical size than new media files in said current format.

23. The electronic device of claim 12, further comprising an input device and an output device.

24. The electronic device of claim 12, wherein the electronic device comprises a mobile electronic device having a digital camera.

25. A computer-readable storage medium having computer readable code embodied therein, said code being executable by a computing device for managing a memory at an electronic device by:

determining a first number of new media files that can be stored in the memory in a current format;

determining when a memory management condition is met, such that the memory is to be managed to store a number of new media files larger than said first number; and, when said memory management condition is met, setting said current format to a second format such that the memory can store a second number of new media files, when acquired, a given new media file in said second format occupying less of the memory than when said given new media file is in said current format, such that said second number is greater than said first number.

* * * * *